(12) United States Patent
Hopper et al.

(10) Patent No.: US 8,098,121 B2
(45) Date of Patent: Jan. 17, 2012

(54) METHOD OF SWITCHING A MAGNETIC MEMS SWITCH

(75) Inventors: Peter J Hopper, San Jose, CA (US);
Trevor Niblock, Santa Clara, CA (US);
Peter Johnson, Sunnyvale, CA (US);
Vladislav Vashchenko, Palo Alto, CA (US)

(73) Assignee: National Semiconductor, Santa Clara, CA (US)

( * ) Notice: Subject to any disclaimer, the term of this patent is extended or adjusted under 35 U.S.C. 154(b) by 0 days.

(21) Appl. No.: 12/852,743

(22) Filed: Aug. 9, 2010

(65) Prior Publication Data

US 2010/0295638 A1    Nov. 25, 2010

Related U.S. Application Data

(62) Division of application No. 11/893,535, filed on Aug. 16, 2007, now Pat. No. 7,839,242.

(51) Int. Cl.
*H01H 51/22* (2006.01)
*H01H 51/34* (2006.01)

(52) U.S. Cl. .......................................... 335/87; 335/78

(58) Field of Classification Search .................... 335/78, 335/83, 87
See application file for complete search history.

(56) References Cited

U.S. PATENT DOCUMENTS

| | | | |
|---|---|---|---|
| 2,830,152 A * | 4/1958 | Tasker et al. | 335/79 |
| 3,652,962 A * | 3/1972 | Preux | 335/203 |
| 4,367,449 A * | 1/1983 | Veisz et al. | 335/229 |
| 4,549,154 A * | 10/1985 | Thoma | 335/87 |
| 4,571,566 A * | 2/1986 | Saur | 335/78 |
| 4,614,927 A * | 9/1986 | Mikami et al. | 335/78 |
| 4,727,344 A * | 2/1988 | Koga et al. | 335/78 |
| 4,881,054 A * | 11/1989 | Polgar | 335/230 |
| 4,933,654 A * | 6/1990 | Hori et al. | 335/78 |
| 5,070,317 A * | 12/1991 | Bhagat | 336/200 |
| 5,150,090 A * | 9/1992 | Miura et al. | 335/84 |
| 5,548,259 A * | 8/1996 | Ide et al. | 335/78 |
| 5,818,316 A * | 10/1998 | Shen et al. | 335/78 |
| 6,633,212 B1 * | 10/2003 | Ruan et al. | 335/78 |
| 6,859,122 B2 * | 2/2005 | Divoux et al. | 335/78 |
| 6,891,454 B1 * | 5/2005 | Naito et al. | 335/78 |
| 6,917,268 B2 * | 7/2005 | Deligianni et al. | 335/78 |
| 2004/0207498 A1 * | 10/2004 | Hyman et al. | 335/78 |
| 2005/0162244 A1 * | 7/2005 | Naito et al. | 335/78 |

* cited by examiner

*Primary Examiner* — Elvin G Enad
*Assistant Examiner* — Alexander Talpalatskiy
(74) *Attorney, Agent, or Firm* — Dergosits & Noah LLP

(57) ABSTRACT

A MEMS magnetic flux switch is fabricated as a ferromagnetic core. The core includes a center cantilever that is fabricated as a free beam that can oscillate at a resonant frequency that is determined by its mechanical and material properties. The center cantilever is moved by impulses applied by an associated motion oscillator, which can be magnetic or electric actuators.

5 Claims, 2 Drawing Sheets

METHOD OF SWITCHING A MAGNETIC MEMS SWITCH

RELATED APPLICATIONS

This application is a divisional of co-pending application Ser. No. 11/893,535, filed on Aug. 16, 2007, by Peter J. Hopper et al. and titled "Magnetic MEMS Switching Regulator. Application Ser. No. 11/893,535, which is hereby incorporated by reference herein in its entirety, is the subject of a Notice of Allowance mailed on Jul. 28, 2010.

Application Ser. No. 11/893,535 claims priority from U.S. Provisional Application No. 60/839,528, filed on Aug. 23, 2006, by Peter J. Hopper et al. and titled "Magnetic MEMS DC-DC Switching Regulator." Provisional Application No. 60/839,528 is hereby incorporated by reference herein in its entirety.

FIELD OF THE DISCLOSURE

The present invention relates to microelectromechanics (MEMS) and, in particular, to a method of switching a magnetic MEMS switch utilizing a magnetic loop.

BACKGROUND

An efficient DC-DC switching regulator transforms one DC voltage to another DC voltage by time slicing the use of an inductive coil. The inductive coil is typically magnetically energized and de-energized with two different time domain periods, thereby leading to a scaling up or a scaling down of the energizing DC voltage.

A typical on-chip implementation of a DC-DC switching regulator circuit requires the fabrication of large inductors on-chip along with high and low side switching transistors. U.S. Pat. No. 5,945,820, issued to Namgoong et al. on Aug. 31, 1999, discloses an example of a DC-DC switching regulator circuit of this type. A disadvantage of this approach, however, is that, as current flows through the two switching transistors, $I^2R$ losses occur.

SUMMARY

Disclosed embodiments provide a DC-DC switching regulator design that does not employ transistors to switch the current through the inductor coil. Rather, a magnetic microelectromechanical (MEMS) switch is used to direct energy between two separate coils having a common magnetic core.

MEMS switches are well known to those skilled in the art. Issues historic to MEMS switches pertain to their reliability. These issues include sparking, degrading contact resistance and the requirement for a conductor pair to actually contact, to thereby switch, to allow electrons to pass through the contact. In short, conventional electric current switches are inherently unreliable.

To avoid these issues, as described in greater detail below, disclosed embodiments utilize a MEMS cantilever structure that does not carry current, but rather carries magnetic flux. Thus, in order to pass flux from a first magnetic path to a second magnetic path requires no contact between the two paths.

The features and advantages of the various aspects of the subject matter disclosed herein will be more fully understood and appreciated upon consideration of the following detailed description and the accompanying drawings which set forth illustrative embodiments.

DETAILED DESCRIPTION

Figure 1:
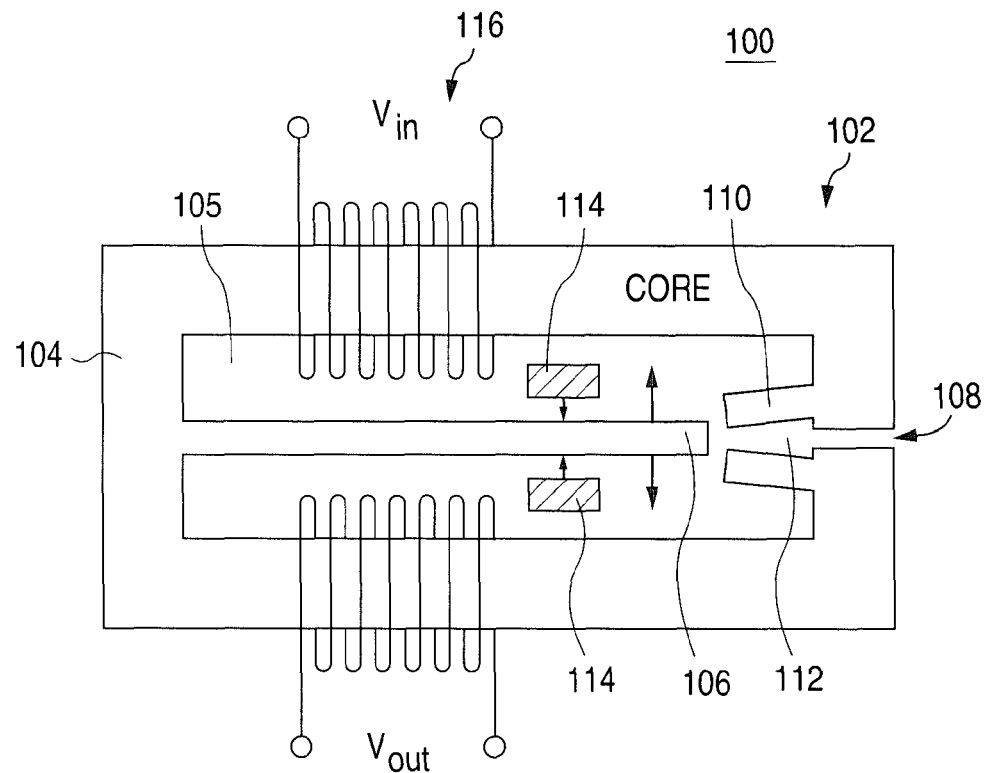
FIG. 1 is a partial cross-section drawing illustrating an embodiment of a magnetic flux switch.

FIG. 1 shows an embodiment of a magnetic flux switch 100. The magnetic flux switch 100 includes a ferromagnetic core 102 that is fabricated in accordance with well-known conventional techniques. The ferromagnetic core 102 includes a core body 104 and a center cantilever 106. The ferromagnetic core body 104 is formed to define an interior cavity 105. The center cantilever 106 is fabricated to extend from the core body 104 into the cavity 105 as a free beam that can oscillate at a resonant frequency that is determined by its mechanical and material parameters. Those skilled in the art will appreciate that these parameters may be selected from a variety of well-known and widely available ferromagnetic materials based upon the particular application in which the magnetic flux switch 100 is to be utilized.

As shown in FIG. 1, the ferromagnetic core body 104 is formed to include a gap 108. As further shown in FIG. 1, the core body 104 preferably includes two core body extensions 110, 112 formed on opposite sides of the gap 108 to facilitate magnetic flux through the core 102 during energization and de-energization, as discussed in greater detail below.

The free beam center cantilever 106 is moved into oscillation (indicated by the arrow in FIG. 1) by impulses applied by an associated cantilever motion oscillator 114 located in proximity to the center cantilever, preferably in the internal cavity near the free end of the center cantilever. The motion oscillator 114 can be, for example, magnetic or electric actuators. That is, a magnetic or electrostatic force is used to move the free beam center cantilever 106 toward resonance.

Vin voltage coil 116 and Vout voltage coil 118 formed around the core body 104 in the very well-known manner. Voltage Vin applied to the core body 104 in FIG. 1 is a DC voltage and, hence, current; voltage Vout applied to the core body 104 is a scaled voltage and current with a DC component.

Figure 2:
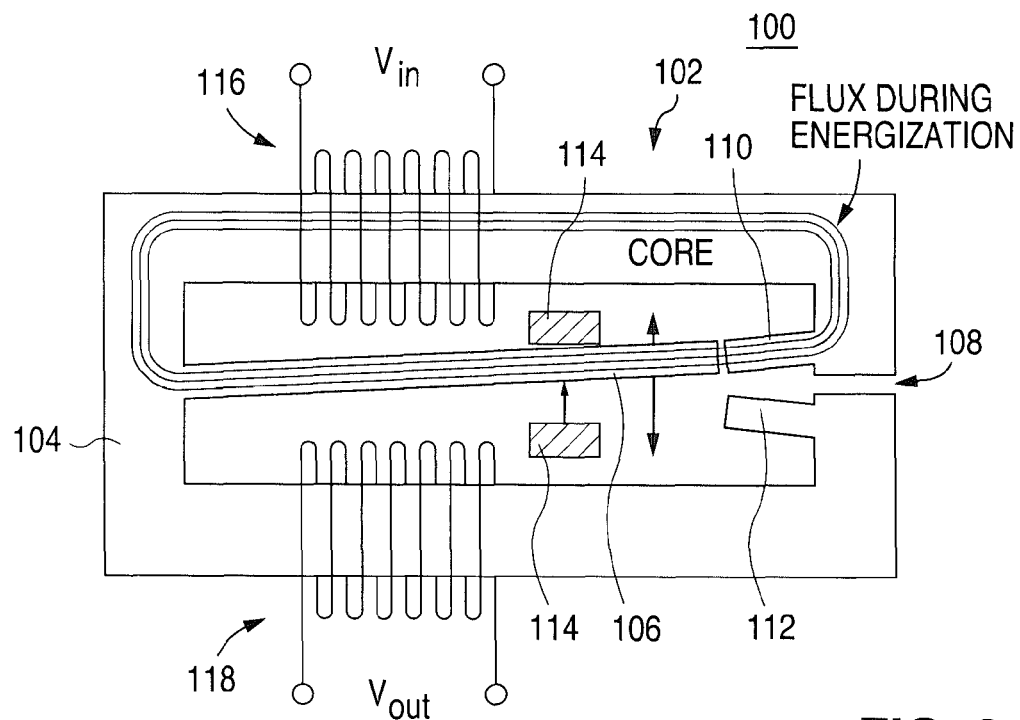
FIG. 2 is a partial cross-section drawing illustrating the FIG. 1 magnetic flux switch with magnetic flux lines running through the core for the case of energization.

FIG. 2 shows the FIG. 1 magnetic flux switch 100 with magnetic flux lines running through the core 102 for the case of energization of the switch. More specifically, when the cantilever motion oscillator 114 causes the free end of the center cantilever 106 to be in an energization mode for the switch 100, i.e. in proximity to the upper core body extension 110 in the FIG. 1 embodiment, the voltage selectively applied to the Vin and Vout coils 116, 118 in the well known manner causes the magnetic flux loop to flow through the center cantilever 106 and the upper portion of the core body 104.

Figure 3:
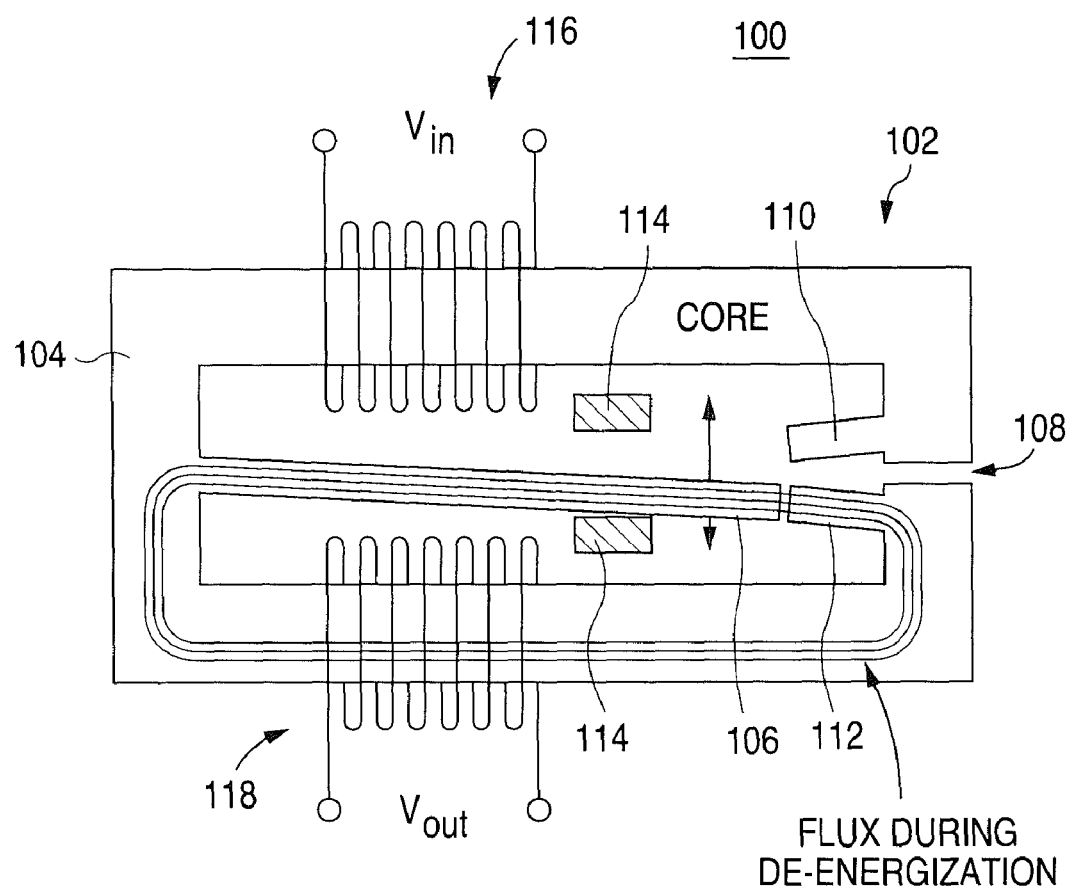
FIG. 3 is a partial cross-section drawing illustrating the FIG. 1 magnetic flux switch with magnetic flux lines running through the core for the case of de-energization.

Conversely, FIG. 3 shows the FIG. 1 magnetic flux switch with magnetic flux lines running through the core 102 for the case of de-energization of the switch. That is, when the cantilever motion oscillator 114 causes the free end of the center cantilever 106 to be in a de-energization mode for the switch 100, i.e. in proximity to the lower core body extension 112 in the FIG. 1 embodiment, the voltage selectively applied to the Vin and Vout coils 116, 118 in the well known manner causes the magnetic flux loop to flow through the center cantilever 106 and the lower portion of the core body 104.

Thus, to pass flux from the upper magnetic path (FIG. 2) to the lower magnetic path (FIG. 3), no physical contact is required. This increases the reliability of the magnetic flux switch 100 over that of conventional MEMS switches.

It should be understood that various alternatives to the embodiments described herein may be employed in practicing the invention. It is intended that the following claims define the scope of the claimed subject matter and that structures and methods within the scope of these claims and their equivalents be covered thereby.

What is claimed is:

1. A method, comprising:
    providing a microelectromechanical (MEMS) magnetic switch that includes
        a ferromagnetic core that includes a core body that defines an internal cavity, the core body having a first end and a second end opposite the first end, the ferromagnetic core further including a center cantilever arm that extends from the first end of the core body and is confined within the internal cavity, the core body having a gap formed in the second end thereof;
        a first core body extension extending from the second end of the core body at a first side of the gap and toward a free end of the center cantilever arm and the first end of the core body such that the free end of the center cantilever arm is in proximity to the first core body extension when the center cantilever arm is in a first position; and
        a second core body extension extending from the second end of the core body at a second side of the gap and toward the free end of the center cantilever arm and the first end of the core body such that the free end of the center cantilever arm is in proximity to the second core body extension when the center cantilever arm is in a second position;
    utilizing a motion oscillator disposed within the internal cavity and in proximity to the center cantilever arm to provide impulses that cause the center cantilever arm to resonate between the first position and the second position;
    selectively applying a voltage in proximity to the core body such that a first magnetic loop is formed in the ferromagnetic core when the center cantilever arm is in the first position and a second magnetic loop is formed in the ferromagnetic core when the center cantilever arm is in the second position.

2. The method of claim 1, wherein the free end of the center cantilever arm is spaced apart from the core body when the center cantilever arm is in the first position.

3. The method of claim 1, wherein the free end of the center cantilever arm is spaced apart from the core body when the center cantilever arm is in the second position.

4. The method of claim 1, wherein a magnetic field is utilized to cause the center cantilever arm to resonate.

5. The method of claim 1, wherein an electric field is utilized to cause the center cantilever arm to resonate.

* * * * *